United States Patent
Safaee et al.

(10) Patent No.: US 9,627,979 B2
(45) Date of Patent: Apr. 18, 2017

(54) DUAL MODE DC-DC CONVERTER

(71) Applicant: Bombardier Transportation GmbH, Berlin (DE)

(72) Inventors: Alireza Safaee, Danvers, MA (US); Konrad Woronowicz, Kingston, CA (US)

(73) Assignee: Bombardier Transportation GmbH, Berlin (DE)

( * ) Notice: Subject to any disclaimer, the term of this patent is extended or adjusted under 35 U.S.C. 154(b) by 203 days.

(21) Appl. No.: 14/506,212

(22) Filed: Oct. 3, 2014

(65) Prior Publication Data
US 2016/0099646 A1 Apr. 7, 2016

(51) Int. Cl.
*H02M 3/335* (2006.01)
*H02M 1/00* (2006.01)

(52) U.S. Cl.
CPC ... *H02M 3/33507* (2013.01); *H02M 3/33584* (2013.01); *H02M 2001/0032* (2013.01)

(58) Field of Classification Search
CPC . H02M 2001/0032; H02M 2001/0048; H02M 2001/0054; H02M 3/335; H02M 3/33507; H02M 3/33569; H02M 3/33576; H02M 3/33584
See application file for complete search history.

(56) References Cited

U.S. PATENT DOCUMENTS

| 6,335,871 | B1 * | 1/2002 | Kita | H02P 4/00 363/35 |
| 2002/0126515 | A1 * | 9/2002 | Boeke | H02M 3/28 363/34 |
| 2004/0037100 | A1 * | 2/2004 | Orr | H02M 3/33576 363/131 |
| 2011/0249472 | A1 | 10/2011 | Jain et al. | |
| 2013/0100707 | A1 * | 4/2013 | Hatakeyama | H02M 3/3376 363/17 |

(Continued)

OTHER PUBLICATIONS

Besselmann et al., "Power Electronic Traction Transformer: Efficiency Improvements Under Light-Load Conditions", IEEE Transactions on Power Electronics, Aug. 2014, p. 3971-3981, vol. 29, No. 8.

(Continued)

*Primary Examiner* — Fred E Finch, III
(74) *Attorney, Agent, or Firm* — The Webb Law Firm

(57) ABSTRACT

In a method of operating a dual mode DC-DC converter having first and second bridge converters connected via a transformer, a capacitor in series with each winding of the transformer, and an inductance, wherein each bridge converter includes a number of switches operating under the control of a controller, in a first mode of operation, the switching of the number of switches is controlled in a manner to transfer DC electrical power from the first bridge converter to the second bridge converter, or vice versa. In a second mode of operation, one switch of each bridge converter is maintained in a closed state and one switch of each bridge converter is maintained in an open state while the switching of the other of the number of switches of the first and second bridge converters is controlled in a manner to transfer DC electrical power from the first bridge converter to the second bridge converter, or vice versa.

14 Claims, 4 Drawing Sheets

(56) References Cited

U.S. PATENT DOCUMENTS

| | | | |
|---|---|---|---|
| 2015/0109827 A1* | 4/2015 | Poshtkouhi | H02M 3/33584 |
| | | | 363/17 |
| 2015/0180345 A1* | 6/2015 | Frost | H02M 3/3376 |
| | | | 363/17 |
| 2016/0211759 A1* | 7/2016 | Luccato | H02M 3/3376 |

OTHER PUBLICATIONS

Poshtkouhi et al., "A Dual Active Bridge DC-DC Converter with Optimal DC-Link Voltage Scaling and Flyback Mode for Enhanced Low-Power Operation in Hybrid PV/Storage Systems", 2014 International Power Electronics Conference, May 1, 2014, p. 2336-2342.
Rodriguez et al., "Different purpose design strategies and techniques to improve the performance of a Dual Active Bridge with phase-shift control", Workshop on Control and Modeling for Power Electronics (COMPEL), Jun. 22, 2014, p. 1-10.
Takasaki et al., "A Power Efficiency Improvement Technique for a Bi-Directional Dual Active Bridge DC-DC Converter at light load", 2013 IEEE Energy Conversion Congress and Exposition, Sep. 15, 2013, p. 1414-1421.

* cited by examiner

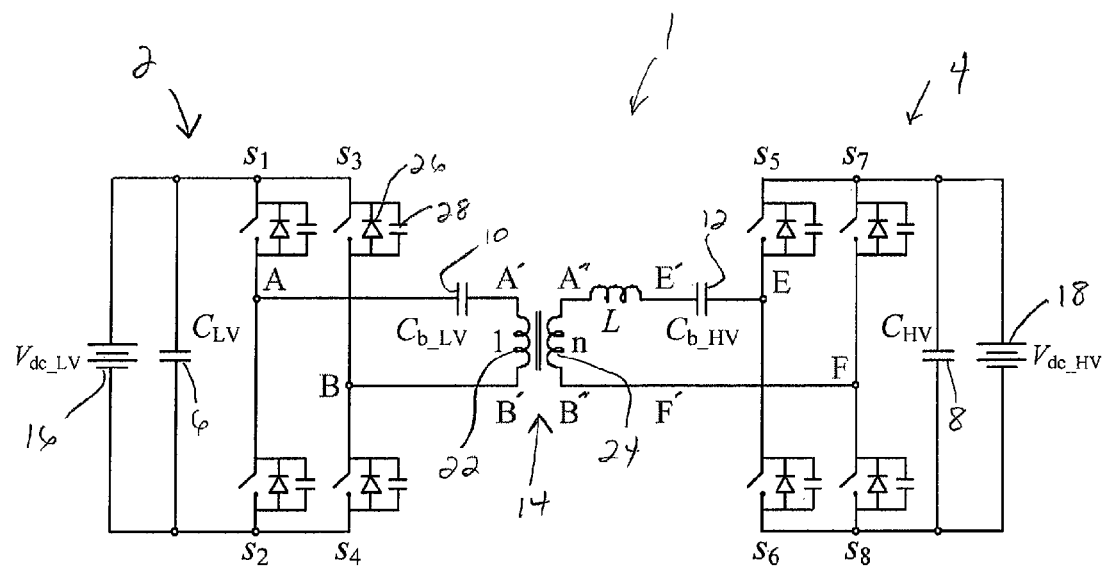
FIG. 1
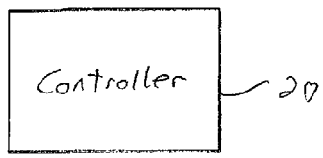
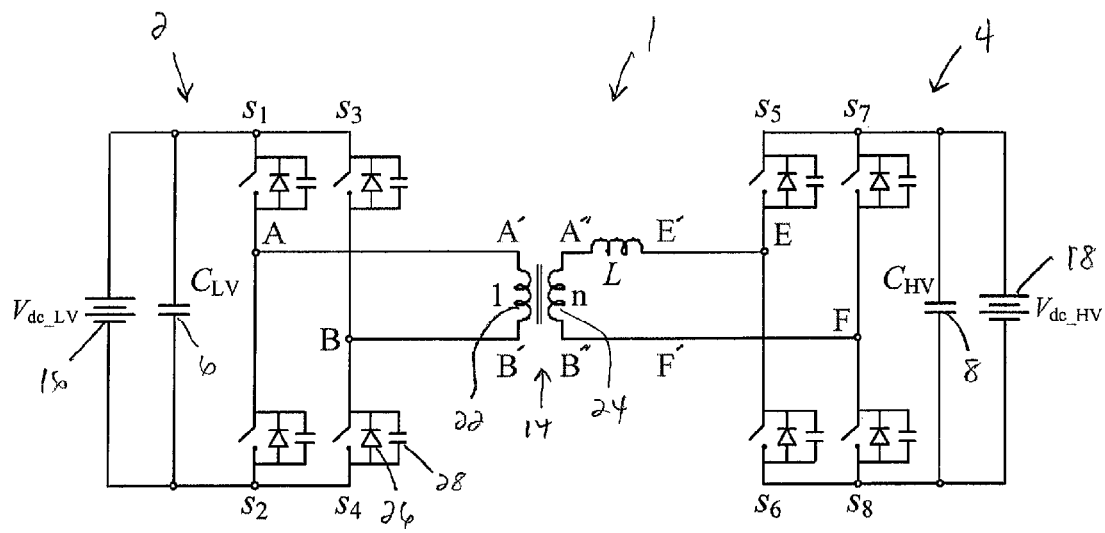
FIG. 2
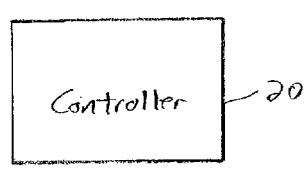

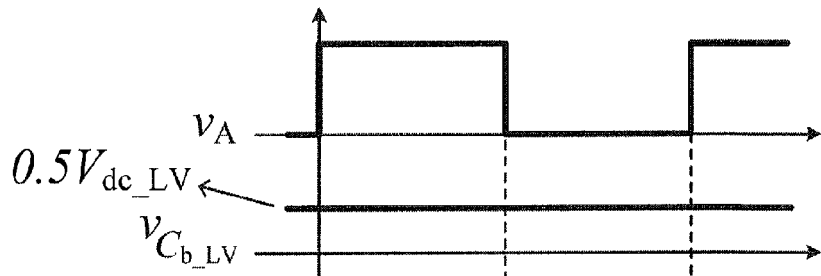
FIG. 5A
FIG. 5B
FIG. 5C
FIG. 5D
FIG. 5E
FIG. 5F
FIG. 5G
FIG. 5H
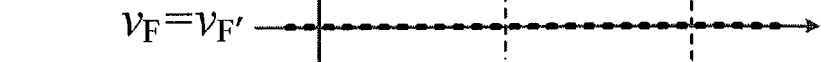
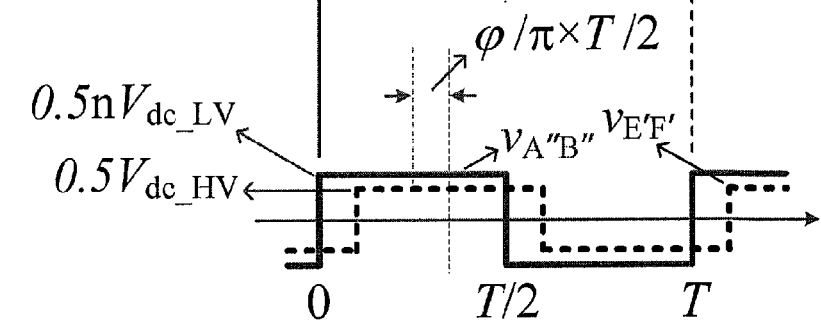
FIG. 5I

DUAL MODE DC-DC CONVERTER

BACKGROUND OF THE INVENTION

Field of the Invention

The present invention relates to a DC-DC converter and, more specifically, to a DC-DC converter that is operational in a high-power mode of operation and a low-power mode of operation.

Description of Related Art

In vehicles, such as automated people movers, a vehicle can include wheels which are configured to travel along a path. These wheels can be tired wheels or, where the path includes rails, the wheels can be conventional rail wheels designed to travel on said rails. In such people movers, it is desired that HVAC systems of such vehicles be operational for 30 minutes or more from battery energy after a grid power failure. To accomplish this, a DC-DC converter typically used to convert high voltage provided on the power grid, for example 750 volts DC, to a lower voltage, for example 100 volts DC, that can be utilized with internal systems within the vehicle, such as overhead lighting, control systems, and the like.

In a normal mode of operation, the converter works in a step-down mode to charge and maintain the voltage of a low voltage DC battery, e.g., a 100 volt DC battery, from the high voltage, e.g., 750 volts DC, available via the power grid.

In an emergency mode, it would be desirable to have the DC-DC converter work in a step-up mode to boost the low voltage (110 VDC) to a high voltage (750 VDC) to feed the HVAC system.

In another example, it would be desirable to enable a vehicle to move to or from a maintenance facility utilizing electrical energy stored in the low voltage battery. For this again, the DC-DC converter is desirably operated in a step-up mode to convert low voltage energy (110 VDC) to high voltage energy (750 VDC) to feed the propulsion system.

Using the DC-DC converter in step-up mode is a high-power operation. Accordingly, it is desired to have high conversion efficiency in step-up operation so as not to waste valuable energy. In contrast, the step-down operation can be high power (when the battery is empty and must be recharged rapidly) or low power (when the battery is less than fully charged).

Heretofore, standard single-mode bidirectional converters have lower efficiency at low power operation, which is most of the time. Accordingly, it would be desirable to enhance the low power efficiency of a bidirectional DC-DC converter with no added active or passive components and with no modification in high power operation and at no additional cost.

SUMMARY OF THE INVENTION

Disclosed herein is a dual mode DC-DC converter comprising: a first bridge converter having first and second switches connected in series, third and fourth switches connected in series, and the first and second series connected switches connected in parallel with the third and fourth series connected switches; a second bridge converter having fifth and sixth switches connected in series, seventh switch and eighth switches connected in series, and the fifth and sixth series connected switches connected in parallel with the seventh and eighth series connected switches; a transformer including a first winding having a first end connected to a first node between the first and second series connected switches and a second end connected to a second node between the third and fourth series connected switches, the transformer further including a second winding having a first end connected to a third node between the fifth and sixth series connected switches and a second end connected to a fourth node between the seventh and eighth series connected switches; an inductance in series with the one of the windings; and a controller, wherein the controller is operative in a first mode whereupon all eight switches are switched in a manner to transfer DC electrical power from the first bridge converter to the second bridge converter, or vice versa, wherein the controller is also operative a second mode whereupon the first, second, fifth, and sixth switches are switched in a manner to transfer DC electrical power from the first bridge converter to the second bridge converter, or vice versa, while the third and seventh switches are maintained in an off-state and the fourth and eighth switches are maintained in an on-state.

The dual mode DC-DC converter can include: a first voltage source connected in parallel across the first and second series connected switches connected in parallel with the third and fourth series connected switches; and a second voltage source connected in parallel across the fifth and sixth series connected switches connected in parallel with the seventh and eighth series connected switches, wherein a voltage of second voltage source is greater than 5 times a voltage of the first voltage source.

The dual mode DC-DC converter can include first and second capacitors connected in parallel with the first and second voltage sources.

The dual mode DC-DC converter can include: a first capacitor in series with the first winding of the transformer; and a second capacitor in series with the second winding of the transformer. The first capacitor can be in series between the first node and the first end of the first winding. The second capacitor can be in series between the third node and the first end of the second winding.

Each switch can comprise a semiconductor transistor. Each switch can further comprise a diode in parallel with the semiconductor transistor.

Each switch can be selectively switched between and open state and a closed state, and vice versa.

The inductance in series with the one winding can be provided by a self-inductance of the one winding, a separate inductor, or some combination thereof.

Also disclosed is a method of operating a dual mode DC-DC converter having first and second bridge converters connected via first and second windings of a transformer, a capacitor in series with each transformer winding, and an inductance, wherein each bridge converter includes a plurality of switches operating under the control of a controller. The method includes: (a) in a first mode of operation, controlling the switching of the plurality of switches in a manner to transfer DC electrical power from the first bridge converter to the second bridge converter, or vice versa; and (b) in a second mode of operation, maintaining one switch of each bridge converter in a closed state and one switch of each bridge converter in an open state while controlling the switching of the other of the plurality of switches of the first and second bridge converters in a manner to transfer DC electrical power from the first bridge converter to the second bridge converter, or vice versa.

The transformer can have first and second windings connected to the first and second bridge converters. During operation of the DC-DC converter in step (a), the plurality of switches can be switched in a manner whereupon DC current is caused to selectively flow in each winding of the transformer in first and second directions. During operation of the DC-DC converter in step (b), the other of the plurality of switches can be switched in a manner whereupon DC current is caused to flow in each winding of the transformer in only a single direction.

The first bridge converter can include switches S1 and S2 connected in series, switches S3 and S4 connected in series, and series connected switches S1 and S2 connected in parallel with series connected switches S3 and S4, a first end of the first transformer winding is connected to a node between switches S1 and S2, and a second end of the first transformer winding is connected to a node between switches S3 and S4. The second bridge converter can include switches S5 and S6 connected in series, switches S7 and S8 connected in series, and series connected switches S5 and S6 connected in parallel with series connected switches S7 and S8, a first end of the second transformer winding is connected to a node between switches S5 and S6, and a second end of the second transformer winding is connected to a node between switches S7 and S8.

Step (a) can include causing switches S1, S4, S5 and S8 to be closed while switches S2, S3, S6 and S7 are caused to be open whereupon current flows in a first direction in each transformer winding. Step (a) can further include causing switches S2, S3, S6 and S7 to be closed while switches S1, S4, S5 and S8 are caused to be open whereupon current flows in a second direction in each transformer winding.

Step (b) can include causing switches S3 and S7 to be open at all times and switches S4 and S8 to be closed at all times. Step (b) can further include causing switches S1 and S5 to be closed and switches S2 and S6 to be open whereupon current flows in the first direction in each transformer winding.

Step (b) can further include causing switches S2 and S6 to be closed and switches S1 and S5 to be open whereupon current flows in the first direction in each transformer winding.

The inductance can be provided by a self-inductance of one transformer winding, a separate inductor, or some combination thereof.

Lastly, disclosed herein is a method of operating a dual mode DC-DC converter having first and second bridge converters connected via an inductance, a transformer that has first and second windings connected to the first and second bridge converters, and first and second capacitors in series with the first and second transformer windings, wherein each bridge converter includes a plurality of switches operating under the control of a controller. The method includes: (a) in a first mode of operation, controlling the open and closed states of the plurality of switches in a manner such that during multiple cycles of transferring DC electrical power from the first bridge converter to the second bridge converter, or vice versa, DC current is caused to alternatingly flow in first and second directions in each winding of the transformer; and (b) in a second mode of operation, controlling the open and closed states of the plurality of switches in a manner such that during multiple cycles of transferring DC electrical power from the first bridge converter to the second bridge converter, or vice versa, DC current is caused to selectively flow in only a single direction in the each winding of the transformer.

In the second mode of operation, the flow of DC current in each winding of the transformer alternately increases and then decreases in only the single direction.

The inductance can be provided by a self-inductance of one winding of the transformer, a separate inductor, or some combination thereof.

BRIEF DESCRIPTION OF THE DRAWINGS

FIG. 1 is an electrical schematic drawing of an embodiment bidirectional DC-DC converter;

FIG. 2 is an electrical schematic of the DC-DC converter of FIG. 1 absent capacitors $C_{b\_LV}$ and $C_{b\_HV}$ under the assumption that the voltage drops across these capacitors is substantially zero or negligible;

FIGS. 5A-5I are graphs of voltage waveforms at various points in the electrical schematic of FIG. 4 on the same timeline for operation of the DC-DC converter of FIG. 1 in the low-power mode of operation.

DETAILED DESCRIPTION OF THE INVENTION

Figure 3A:
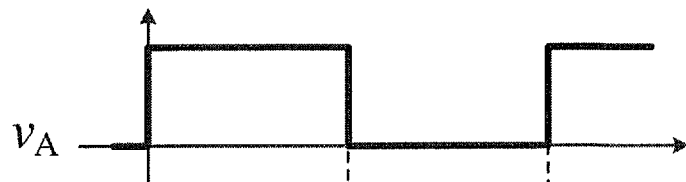
FIGS. 3A-3I are graphs of voltage waveforms at various points in the electrical schematics of FIGS. 1 and 2 on the same timeline for operation of the DC-DC converter of FIG. 1 in a high-power mode of operation.
Figure 3B:
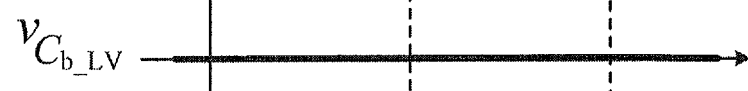
Figure 3C:
Figure 3D:
Figure 3E:
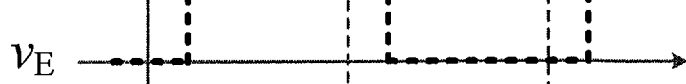
Figure 3F:
Figure 3G:
Figure 3H:
Figure 3I:
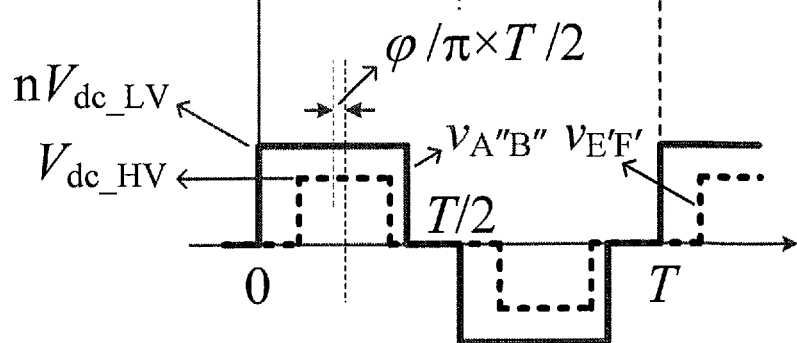

The present invention will be described with reference to the accompanying figures where like reference numbers correspond to like elements.

With reference to FIG. 1, an embodiment bidirectional DC-DC converter 1 includes two standard four-switch full bridge converters at each side of the circuit. Switches $S_1$-$S_4$ form a low voltage (LV) full bridge converter 2 and switches $S_5$-$S_8$ form a high voltage (HV) full bridge converter 4.

Capacitors $C_{LV}$ 6 and $C_{HV}$ 8 are DC capacitors for the DC-link of the LV full bridge converter 2 and HV full bridge converter 4, respectively.

Two capacitors $C_{b\_LV}$ 10 and $C_{b\_HV}$ 12 are in series between AC lines of LV converter 2 and HV converter 4 and a transformer 14. More specifically, in LV converter 2, switches $S_1$ and $S_2$ are connected in series, and switches $S_3$ and $S_4$ are connected in series. The series connections of switches $S_1$ and $S_2$ are connected in parallel with the series connection of switches $S_3$ and $S_4$. Transformer 14 includes a first winding 22 having a first end A' connected to a node A between switches $S_1$ and $S_2$ via capacitor $C_{b\_LV}$ 10. A second end B' is connected to a node B between switches $S_3$ and $S_4$. Transformer 14 also includes a second winding 24 having a first end A'' connected to a node E between series connected switches $S_5$ and $S_6$ via capacitor $C_{b\_HV}$ 12 and a second end B'' connected to a node F between series connected switches $S_7$ and $S_8$ which are in parallel with switches $S_5$ and $S_6$. As shown, each switch can include a diode 26 and a capacitor 28 in parallel with the actual switch element itself. Each switch is desirably a semiconductor device, such as a semiconductor transistor. However, this is not to be construed as limiting the invention.

Converter 1 can be designed as a non-resonant converter by selecting large values for $C_{b\_LV}$ 10 and $C_{b\_HV}$ 12 or it can be designed as a resonant converter by selecting small values for $C_{b\_LV}$ 10 and $C_{b\_HV}$ 12.

Power transfer from LV full bridge converter 2 to HV full bridge converter 4, and vice versa, is determined by the value of L, a series inductance. L can be a separate inductor, the self-inductance of a winding of a transformer 14 itself, or some combination thereof. The smaller the value of L, the larger the power transfer.

With reference to FIG. 2 and with continuing reference to FIG. 1, in a high-power mode of operation, converter 1 operates under the control of a controller 20 as a standard dual active bridge bidirectional DC-DC converter. For the purpose of describing the high-power mode of operation, converter 1 is considered to be a non-resonant converter with large values for $C_{b\_LV}$ 10 and $C_{b\_HV}$ 12, whereupon the voltages across $C_{b\_LV}$ 10 and $C_{b\_HV}$ 12 are negligible and can be (for the purpose of analysis and description) replaced by short circuits as shown in FIG. 2.

With reference to FIG. 3 and with continuing reference to FIGS. 1 and 2, inter-bridge phase shift, $\phi$, is defined herein as a phase shift between $v_{A'B'}$ and $v_{E'F'}$. When $\phi$ is positive $v_{A'B'}$ leads $v_{E'F'}$ and converter 1 functions in step-up operation, with DC electrical power flowing from LV converter 2 to HV converter 4. When $\phi$ is negative $v_{A'B'}$ lags $v_{E'F'}$ and converter 1 is in step-down operation with DC electrical power flowing from HV converter 4 to LV converter 2.

In the high-power mode of operation, all eight switches $S_1$-$S_8$ of converter 1 perform switching actions in a manner known in the art under the control of controller 20 such that current alternatingly flows in opposite directions in each winding 22 and 24 of transformer 14. Subject to any voltage drops cross switches $S_1$-$S_4$, the peak value of $v_{AB}$ is equal to the voltage of voltage source $V_{dc\_LV}$ 16. Similarly, subject to any voltage drops across switches $S_5$-$S_8$, the peak value of $v_{EF}$ is equal to the voltage of voltage source $V_{dc\_HV}$ 18. Assuming zero voltage drops across $C_{b\_LV}$ 10 and $C_{b\_HV}$ 12, $v_{A'}=v_A$ and $v_{E'}=v_E$. Therefore, $v_{A'B'}=v_{AB}$ and $v_{E'F'}=v_{EF}$. Also, since current alternatingly flows in opposite directions in each winding 22 and 24 of transformer 14 whereupon there is zero or negligible voltage drops across $C_{b\_LV}$ 10 and $C_{b\_LV}$ 12, $v_{A'B'}$ and $v_{E'F'}$ have no net DC components. When the duty cycles of both $v_{A'B'}$ and $v_{E'F'}$ are equal to one, the power transferred from LV converter 2 to HV converter 4, or vice versa, is:

$$P_{High\text{-}Power\text{-}Mode} = \frac{n^2 \varphi}{L\omega}\left(1 - \frac{|\varphi|}{\pi}\right) V_{dc\_LV} V_{dc\_HV} \quad (1)$$

where n=the turns ratio of transformer 14.

Figure 4:
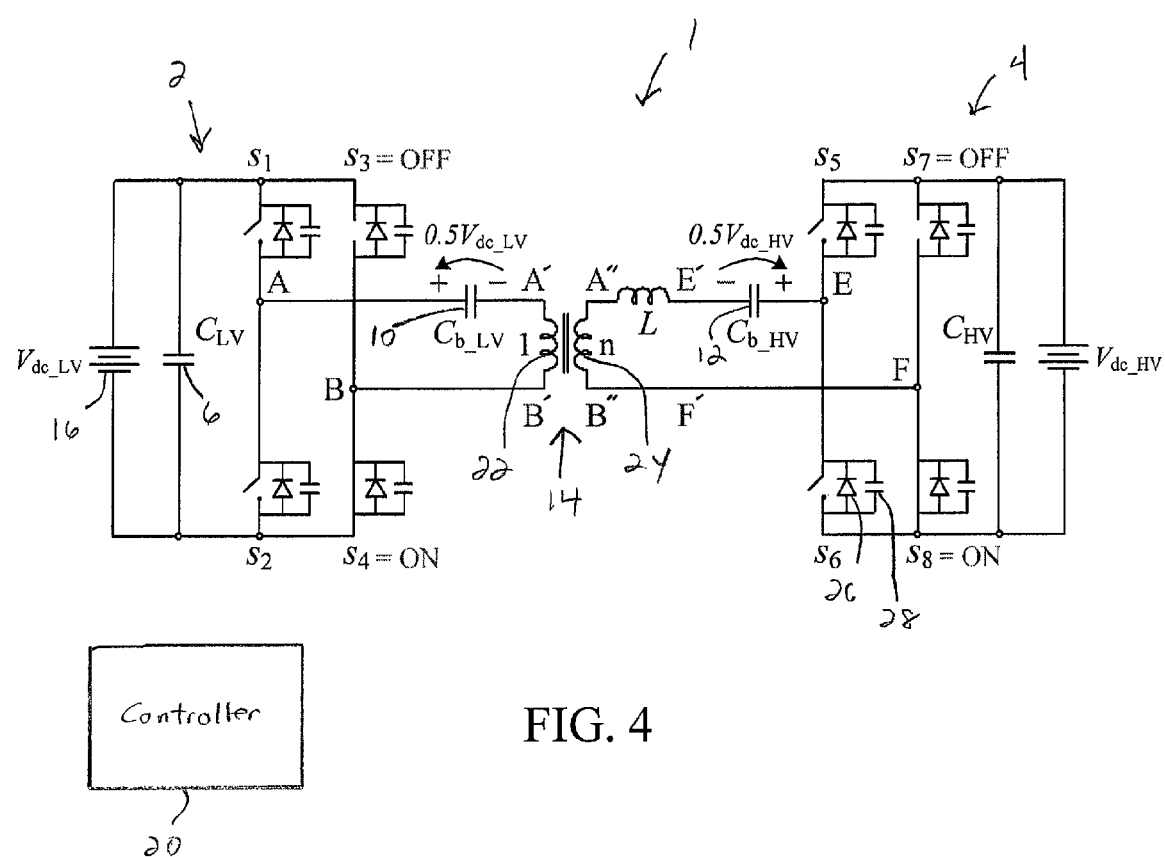
FIG. 4 is an electrical schematic of the converter of FIG. 1 showing the states of the switches when the DC-DC converter of FIG. 1 is used in a low-power mode of operation.

With reference to FIG. 4, in a low-power mode of operation, converter 1 operates under the control of controller 20. More specifically, in the low-power mode of operation, only four of the eight switches ($S_1$-$S_8$) of converter 1 perform switching actions. More specifically, switches $S_1$ and $S_2$ of LV converter 2 and switches $S_5$ and $S_6$ in HV converter 4 perform switching actions. Switches $S_3$ and $S_7$ are constantly off (open) and $S_4$ and $S_8$ are constantly on (closed). In the low-power mode of operation, $v_{B'}=v_B=0$ and $v_{F'}=v_F=0$ (with respect to the ground level on each side). Therefore, $v_{A'B'}=v_{A'}$ and $v_{E'F'}=v_{E'}$.

Subject to minor voltage drops across switches $S_1$, $S_2$, $S_4$, $S_5$, $S_6$, and $S_8$, $v_A$ and $v_E$ have peak-peak voltage swings of $V_{dc\_LV}$ and $V_{dc\_HV}$ and DC levels of 0.5 $V_{dc\_LV}$ and 0.5 $V_{dc\_HV}$ caused by the DC voltages across $C_{b\_LV}$ 10 and $C_{b\_HV}$ 12, respectively. As shown in FIG. 4, $C_{b\_LV}$ 10 and $C_{b\_LV}$ 12 block the DC content of $v_A$ and $v_E$, respectively. Therefore $v_{A'B'}$ and $v_{E'F'}$ have no net DC components and, hence, no amplitudes of 0.5 $V_{dc\_LV}$ and 0.5 $V_{dc\_HV}$, respectively. Here the duty cycles of both $v_{A'B'}$ and $v_{E'F'}$ are always equal to one, and the power transferred from LV converter 2 to HV converter 4, or vice versa, is:

$$P_{Low\text{-}Power\text{-}Mode} = \frac{n^2 \varphi}{4L\omega}\left(1 - \frac{|\varphi|}{\pi}\right) V_{dc\_LV} V_{dc\_HV} \quad (2)$$

Converter 1 in the low-power mode operates as a dual active bridge bidirectional DC-DC converter and transfers only 25% of the nominal power from LV converter 2 to HV converter 4, or vice versa, that converter 1 would normally transfer in the high-power mode of operation. In other words, in the low-power mode of operation, converter 1 has only 25% the efficiency at transferring DC electrical power from LV converter 2 to HV converter 4, or vice versa, versus converter 1 operating in the high-power mode of operation.

Comparing the waveforms shown in FIGS. 3A-3I to the waveforms shown in FIGS. 5A-5I, it can be seen that in the high-power mode of operation (FIGS. 3A-3I), $v_{A'B'}$ and $v_{E'F'}$ over time are AC voltages, whereupon the currents in first winding 22 and second winding 24 will alternatingly reverse direction. In contrast, in the lower-power mode of operation (FIGS. 5A-5I), $v_{B'}=v_B=v_{F'}=v_F=0$. Hence, the application of periodic pulsed voltage $v_A$ (FIG. 5A) will charge capacitor $C_{b\_LV}$ 10 to a value of approximately 0.5 $V_{dc\_LV}$ and will charge capacitor $C_{b\_HV}$ 12 to approximately 0.5 $V_{dc\_HV}$. Hence, a difference between the high-power mode of operation and the low-power mode of operation resides in the fact that in the high-power mode of operation, each quasi-square waveform $v_{A'}$, $v_{B'}$, $v_{A''}$, and $v_{B''}$ has an amplitude equal to the DC voltage on its respective bus ($V_{dc\_LV}$ 16 for $v_{A'}$ and $v_{B'}$; and $V_{dc\_HV}$ 18 for $v_{A''}$ and $v_{B''}$). In contrast, in the low-power mode of operation, each quasi-square waveform $v_{A'}$ and $v_{B''}$ has an amplitude equal to one-half of its respective bus DC voltage $V_{dc\_LV}$ 16 and $V_{dc\_HV}$ 18 because each series capacitor $C_{b\_LV}$ 10 and $C_{b\_HV}$ 12 is charged to one-half (or substantially one-half) of its corresponding bus DC voltage, i.e., 0.5 $V_{dc\_LV}$ and 0.5 $V_{dc\_HV}$.

As can be seen, the low-power mode of operation is achieved with no added passive or active components. In the low-power mode of operation, only four of eight switches of converter 1 perform switching and switches $S_4$ and $S_8$ are constantly closed, therefore the gate losses (voltage drops) across constantly open switches $S_3$ and $S_5$ are not present. With only four switches involved in the switching actions, switching losses are lower.

While controlling the power transfer in the high-power mode of operation, a slight change of $\phi$ results in a large variation in power transfer from LV converter 2 to HV converter 4, or vice versa, especially at low power levels. From (1):

$$\frac{dP_{High\text{-}Power\text{-}Mode}}{d\varphi} = \frac{n^2}{L\omega} V_{dc\_LV} V_{dc\_HV}\left(1 - \frac{\varphi}{\pi/2}\right) \quad (3)$$

From equation (3) it can be seen that variations of $P_{High\text{-}Power\text{-}Mode}$ with $\phi$ is very large when $\phi$ is close to zero. This makes the task of designing controller 20 challenging.

In the low-power mode of operation, however, at each $\phi$ value the power is 25% of the power at the same $\phi$ in the high-power mode of operation. Therefore, in the low-power mode of operation a larger change in $\phi$ is needed to control the power transfer from LV converter 2 to HV converter 4, or vice versa, around $\phi\sim0$. This facilitates the design of controller 20.

From the viewpoint of transferring power from LV converter 2 to HV converter 4, or vice versa, there is considerable overlap in the ranges of DC power that both the low- and the high-power modes of operation can transfer. Therefore, transitions between the low- and the high-power modes, and vice versa, can be controlled by controller 20 smoothly using a wide hysteresis to be noise-immune.

Finally, converter 1 in the high-power mode of operation loses the desirable zero voltage switching (ZVS), i.e., switching at zero voltage crossing, at lower power levels due to lack of current. By introducing the low-power mode of operation, the current level increases and the range of ZVS operation is expanded, which increases the efficiency at lower power levels.

The present invention has been described with reference to the accompanying figures. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A dual mode DC-DC converter comprising:
a first bridge converter having first and second switches connected in series, third and fourth switches connected in series, and the first and second series connected switches connected in parallel with the third and fourth series connected switches;
a second bridge converter having fifth and sixth switches connected in series, seventh switch and eighth switches connected in series, and the fifth and sixth series connected switches connected in parallel with the seventh and eighth series connected switches;
a transformer including a first winding having a first end connected to a first node between the first and second series connected switches and a second end connected to a second node between the third and fourth series connected switches, the transformer further including a second winding having a first end connected to a third node between the fifth and sixth series connected switches and a second end connected to a fourth node between the seventh and eighth series connected switches;
an inductance in series with one of the windings; and
a controller, wherein the controller is operative in a first mode whereupon all eight switches are switched in a manner to transfer DC electrical power from the first bridge converter to the second bridge converter, or vice versa, wherein the controller is also operative in a second mode whereupon the first, second, fifth, and sixth switches are switched in a manner to transfer DC electrical power from the first bridge converter to the second bridge converter, or vice versa, while the third and seventh switches are maintained in an off-state and the fourth and eighth switches are maintained in an on-state.

2. The dual mode DC-DC converter of claim 1, further including:
a first voltage source connected in parallel across the first and second series connected switches connected in parallel with the third and fourth series connected switches; and
a second voltage source connected in parallel across the fifth and sixth series connected switches connected in parallel with the seventh and eighth series connected switches, wherein a voltage of second voltage source is greater than 5 times a voltage of the first voltage source.

3. The dual mode DC-DC converter of claim 1, further including first and second capacitors connected in parallel with the first and second voltage sources.

4. The dual mode DC-DC converter of claim 1, further including:
a first capacitor in series with the first winding of the transformer; and
a second capacitor in series with the second winding of the transformer.

5. The dual mode DC-DC converter of claim 4, wherein:
the first capacitor is in series between the first node and the first end of the first winding; and
the second capacitor is in series between the third node and the first end of the second winding.

6. The dual mode DC-DC converter of claim 1, wherein each switch comprises a semiconductor switch.

7. The dual mode DC-DC converter of claim 6, wherein each switch further comprises a diode in parallel with the semiconductor switch.

8. The dual mode DC-DC converter of claim 1, wherein each switch is selectively switched between an open state and a closed state, and vice versa.

9. The dual mode DC-DC converter of claim 1, wherein the inductance in series with the one winding is provided by a self-inductance of the one winding, a separate inductor, or some combination thereof.

10. A method of operating a dual mode DC-DC converter having first and second bridge converters connected via first and second windings of a transformer, a capacitor in series with each transformer winding, and an inductance, wherein each bridge converter includes a plurality of switches operating under the control of a controller, the method comprising:
(a) in a first mode of operation, controlling the switching of the plurality of switches over multiple switching cycles in a manner to transfer DC electrical power from the first bridge converter to the second bridge converter, or vice versa; and
(b) in a second mode of operation, maintaining one switch of each bridge converter in a closed state and one switch of each bridge converter in an open state while controlling the switching of the other of the plurality of switches of the first and second bridge converters over multiple switching cycles in a manner to transfer DC electrical power from the first bridge converter to the second bridge converter, or vice versa, and to cause each capacitor to be charged to a DC voltage.

11. The method of claim 10, wherein:
the transformer has first and second windings connected to the first and second bridge converters;
during operation of the DC-DC converter in step (a), the plurality of switches is switched in a manner whereupon DC current is caused to selectively flow in each winding of the transformer in first and second directions; and
during operation of the DC-DC converter in step (b), the other of the plurality of switches are switched in a manner whereupon DC current is caused to flow in each winding of the transformer in only a single direction.

12. The method of claim 10, wherein:
the first bridge converter includes switches S1 and S2 connected in series, switches S3 and S4 connected in series, and series connected switches S1 and S2 connected in parallel with series connected switches S3 and S4, a first end of the first transformer winding is connected to a node between switches S1 and S2, and a second end of the first transformer winding is connected to a node between switches S3 and S4;
the second bridge converter includes switches S5 and S6 connected in series, switches S7 and S8 connected in series, and series connected switches S5 and S6 connected in parallel with series connected switches S7 and S8, a first end of the second transformer winding is connected to a node between switches S5 and S6, and a second end of the second transformer winding is connected to a node between switches S7 and S8;

step (a) includes causing switches S1, S4, S5 and S8 to be closed while switches S2, S3, S6 and S7 are caused to be open whereupon current flows in a first direction in each transformer winding;

step (a) further includes causing switches S2, S3, S6 and S7 to be closed while switches S1, S4, S5 and S8 are caused to be open whereupon current flows in a second directions in each transformer winding;

step (b) includes causing switches S3 and S7 to be open at all times and switches S4 and S8 to be closed at all times; and step (b) further includes causing switches S1 and S5 to be closed and switches S2 and S6 to be open whereupon current flows in the first direction in each transformer winding.

13. The method of claim 12, wherein step (b) further includes causing switches S2 and S6 to be closed and switches S1 and S5 to be open whereupon current flows in the first direction in each transformer winding.

14. The dual mode DC-DC converter of claim 10, wherein the inductance is provided by a self-inductance of one transformer winding, a separate inductor, or some combination thereof.

\* \* \* \* \*